US007345712B2

(12) United States Patent
Sohn

(10) Patent No.: US 7,345,712 B2
(45) Date of Patent: Mar. 18, 2008

(54) DISPLAY APPARATUS

(75) Inventor: Young-wook Sohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 527 days.

(21) Appl. No.: 11/085,187

(22) Filed: Mar. 22, 2005

(65) Prior Publication Data

US 2005/0225681 A1 Oct. 13, 2005

(30) Foreign Application Priority Data

Apr. 9, 2004 (KR) ...................... 10-2004-0024566

(51) Int. Cl.
*H04N 5/52* (2006.01)
*H04N 5/14* (2006.01)
*H04N 3/12* (2006.01)
*G09G 3/36* (2006.01)

(52) U.S. Cl. ...................... 348/671; 348/678; 348/797; 348/910; 348/607; 345/63

(58) Field of Classification Search ................ 348/790, 348/795, 797, 701, 441, 97, 607, 618, 620, 348/910, 671-674, 678; 345/60, 61, 63, 345/87, 77, 89, 589, 596, 690
See application file for complete search history.

(56) References Cited

U.S. PATENT DOCUMENTS 5,400,048 A * 3/1995 Shimada et al. .............. 345/97
5,952,991 A * 9/1999 Akiyama ...................... 345/98
6,018,329 A 1/2000 Kida et al.
6,151,001 A * 11/2000 Anderson et al. ............. 345/63
6,661,400 B2 * 12/2003 Sakashita ...................... 345/89
6,965,358 B1 * 11/2005 Kasahara et al. ............. 345/63

(Continued)

FOREIGN PATENT DOCUMENTS

CN 1375992 10/2002

(Continued)

OTHER PUBLICATIONS

Chinese Office Action dated Mar. 30, 2007 issued in CN 2005100026977.

*Primary Examiner*—Victor R. Kostak
(74) *Attorney, Agent, or Firm*—Stanzione & Kim, LLP

(57) ABSTRACT

A display apparatus to receive a picture signal containing information of a picture and to process the picture signal using at least an area distinguishing the picture from another picture includes a motion detector to detect whether there is a motion in the area of the picture signal, a hysteresis generator to output hysteresis information on each area according to a detected result of the motion detector from a previous frame up to a current frame, a moving picture detector to detect whether the picture signal is a moving picture signal or a still picture signal in the area on the basis of the hysteresis information, and a gradation level converter to convert the picture signal corresponding to the area into either a group of gradation levels for a moving picture to display the moving picture signal or a group of gradation levels for a still picture to display the still picture signal according to a detecting result of the moving picture detector. With this configuration, a false contour of a moving picture signal can be attenuated, thereby minimizing a flicker.

9 Claims, 6 Drawing Sheets

U.S. PATENT DOCUMENTS

2002/0190925 A1* 12/2002 Awamoto et al. ............. 345/60
2002/0190940 A1* 12/2002 Itoh et al. ..................... 345/87
2003/0156301 A1* 8/2003 Kempf et al. ............... 358/486
2004/0201564 A1* 10/2004 Sugino et al. .............. 345/101
2005/0248557 A1* 11/2005 Miyazawa .................. 345/204
2006/0007250 A1* 1/2006 Jung et al. .................. 345/690

FOREIGN PATENT DOCUMENTS

JP 10-171401 6/1998
JP 10-304281 11/1998

* cited by examiner

DISPLAY APPARATUS

CROSS-REFERENCE TO RELATED APPLICATIONS

This application claims the benefit of Korean Patent Application No. 2004-24566, filed Apr. 9, 2004, in the Korean Intellectual Property Office, the disclosure of which is incorporated herein by reference.

BACKGROUND OF THE INVENTION

1. Field of the Invention

The present general inventive concept relates to a display apparatus, and more particularly, to a display apparatus displaying a moving picture and a still picture using different gradation levels.

2. Description of the Related Art

Among display apparatuses displaying a group of gradations using a time-sharing method, a PDP (Plasma Display Panel) and a DMD (Digital Mirror Device) generate a false contour in a moving picture. Here, the false contour indicates a kind of an afterimage due to a gradation level difference between a moving picture area and its adjacent area, wherein the gradation level difference is visually persisted and looks like a contour.

FIG. 1 is a schematic control block diagram of a conventional PDP to attenuate a false contour of a moving picture.

As shown in FIG. 1, the PDP includes a motion detector 101, a gradation level selector (or gradation selector) 102, a gradation level converter (or gradation converter) 103 and a panel actuator 104.

The motion detector 101 detects a motion area and a still area in a picture from a picture signal to be displayed. As a detection method, there is used a motion estimation method of sampling motion vectors per regular-sized block of two consecutive frames (a former frame and a current frame), or a motion detection method of detecting a picture data change of a pixel.

The gradation level selector 102 includes a group of gradation levels for a moving picture and a group of gradation levels for a still picture and selects one of the groups according to the result of the motion detector 101.

The gradation level converter 103 converts the picture signal into one of the groups of gradation levels selected by the gradation level selector 102, and provides the converted picture signal to the panel actuator 104.

The picture corresponding to the picture signal is divided into the motion area and the still area by the motion detector 101. The picture signal in each area is provided to the panel actuator 104 after converted into a corresponding group of gradation levels by the gradation level convertor 103. Since there are few gradation levels suitable for a moving picture, the picture in motion is not visually precised thereby reducing the false contour. On the other hand, the still picture can be precisely displayed using the gradation levels suitable for the still picture.

However, if the result of the motion detector 101 for every area of the picture changes frequently, the gradation level converter 103 constantly converts the picture signal into different gradation levels. Accordingly, the same picture signals are alternatively converted into different gradation levels, and thus it becomes hard to maintain a constant gradation level with respect to the same picture signals. In other words, the conventional display apparatus selects a group of gradation levels depending on a type of the picture signal of the current frame, thereby frequently causing a flicker.

SUMMARY OF THE INVENTION

In order to solve the foregoing and/or other problems, it is an aspect of the present general inventive concept to provide a display apparatus to minimize a cause of flicker.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a display apparatus to receive a picture signal containing information of a picture and to process the picture signal according to at least an area distinguishing the picture from another picture, the display apparatus including a motion detector to detect whether there is a motion in an area of the picture signal, a hysteresis generator to output hysteresis information on each area according to a detected result of the motion detector detected from a previous frame up to a current frame, a moving picture detector to detect whether the picture signal is a moving picture signal or a still picture signal on the basis of the hysteresis information, and a gradation level converter to convert the picture signal into either a group of gradation levels for the moving picture to display the moving picture signal or a group of gradation levels for the still picture to display the still picture signal, according to a detected result of the moving picture detector.

According to an aspect of the general inventive concept, the hysteresis generator outputs the hysteresis information by adding and subtracting a weight to and from a predetermined hysteresis parameter according to the detecting result of the motion detector, and the moving picture detector detects whether the picture signal corresponding to the area is the moving picture signal or the still picture signal based on a value of the hysteresis parameter.

According to another aspect of the general inventive concept, the moving picture detector detects the picture signal having the area as the moving picture signal in a case that the value of the hysteresis parameter reaches a predetermined reference range of the moving picture, detects the picture signal having the area as the still picture signal in a case that the value of the hysteresis parameter reaches a predetermined reference range of the still picture, and outputs to maintain the detected result of the motion detector on the previous frame as the current frame in a case that the value of the hysteresis parameter is between the reference range of the moving picture and the reference range of the still picture.

According to yet another aspect of the general inventive concept, the hysteresis parameter includes a permitted limit of variation.

According to another aspect of the general inventive concept, the moving picture detector detects the picture signal of the area as the moving picture signal in a case that a motion of the area is repeatedly detected in at least two consecutive frames by the motion detector.

According to another aspect of the present general inventive concept, the display apparatus-further includes a film mode detector to detect each frame of the picture signal inputted as a film mode so that it is repeatedly inputted for a predetermined number of times, wherein the moving picture detector changes a detecting reference based on the hysteresis information according to a detected result of the film mode detector.

According to another aspect of the general inventive concept, the motion detector detects whether the picture signal corresponding to the area is in motion by detecting a predetermined number of sample pixels in the area, and the hysteresis generator outputs the hysteresis information of the area containing the sample pixels from a previous frame up to a current frame based on the detected results of the motion detector detected from the sample pixels of each area.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
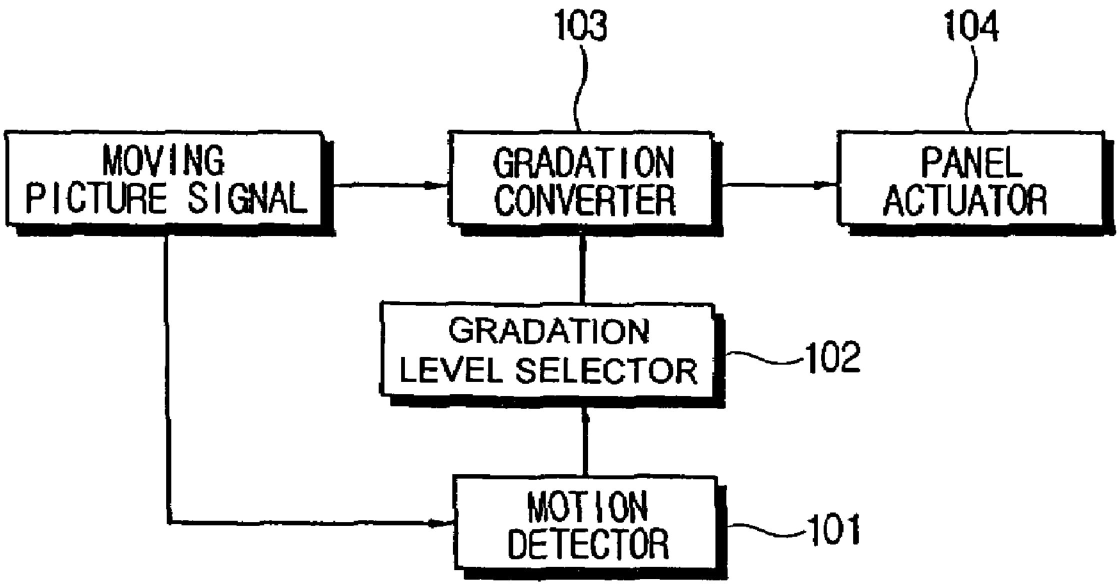
FIG. 1 (PRIOR ART)
FIG. 1 is a schematic control block diagram of a conventional PDP (Plasma Display Panel) to attenuate a false contour in a moving picture.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
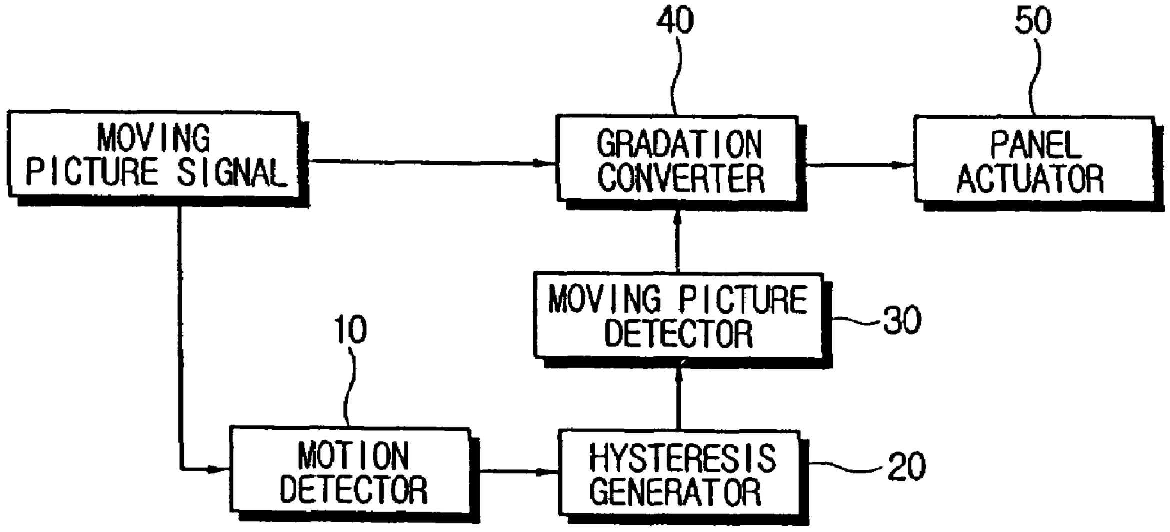
FIG. 2 is a control block diagram of a display apparatus according to an embodiment of the present general inventive concept.

FIG. 2 is a control block diagram of a display apparatus according to an embodiment of the present general inventive concept.

As shown in FIG. 2, the display apparatus may include a motion detector 10, a hysteresis generator 20, a moving picture detector 30, a gradation level converter 40 and a panel actuator 50.

A picture signal may contain information about a picture that has at least one area or is divided into at least two areas. The motion detector 10 can detect whether there is a motion in the area of the picture according to the picture signal. Here, it may require a lot of calculation operations and a large memory space in a case that the motion detector 10 has to detect the motion from every pixel of the area. Accordingly, it is possible to select a predetermined number of sample pixels from each area and detect the motion from the sample pixels, and save the detected results.

The hysteresis generator 20 can output hysteresis information about the detected results of the motion detector 10 with respect to each area from at least one of previous frames up to a current frame. Here, the hysteresis information may be simple information about the detected results of a predetermined number of previously detected frames fields, or accumulated information about changes of the former detected results.

According to an aspect of the present general inventive concept, the hysteresis generator 20 may be a history generator to generate history information (hysteresis information) about a history corresponding to one or more changes in one or more areas of one or more previous frames or another history corresponding to a parameter of the previous frame with respect to a predetermined parameter range so as to determine a parameter of the current frame relative to the parameter of the previous frame within the predetermined parameter range.

In a case that the motion detector 10 detects the motion from the sample pixels, the hysteresis generator 20 can output the hysteresis information about the area based on the detected results of the motion detector 10 detecting the motion from the sample pixels.

The moving picture detector 30 can detect whether the picture signal corresponding to each area has a motion or still image based on the hysteresis information on each area. Here, the hysteresis information can include the detected result of the motion detector 10 with respect to the current frame.

The gradation level converter 40 can convert the picture signal corresponding to each area into a group of gradation levels for a moving picture to display a moving picture signal or a group of gradation levels for a still picture to display a still picture signal depending on the detecting result of the motion detector 10. Here, the group of gradation levels for the moving picture can attenuate a false contour in the moving picture, and the group of gradation levels for the still picture can include relatively many gradation levels compared to the group of gradation levels for the moving picture.

The panel actuator 40 can display a picture on each pixel of a panel according to a group of gradation levels which has been converted from the picture signal by the gradation level converter 40.

An operation of the display apparatus of FIG. 2 will be described hereinafter.

A handling process of the picture signal inputted to the display apparatus can be discriminated depending on an area having a picture which contains the motion or still image. In other words, according to a detecting operation of detecting from the picture corresponding to each area whether the area contains the motion or still image, an outputting operation of outputting the hysteresis information corresponding to the detected results in each area, another detecting operation of detecting the moving and still picture signal corresponding to each area according to the hysteresis information, and a selecting operation of selecting a group of gradation level based on the detected moving and still picture signal of each area, the picture signal of each pixel constituting the area can be converted into the selected group of gradation levels.

In an aspect of the present general inventive concept, a same group of gradation levels selected for an area of the former frame can be applied to the area of the current frame although a motion of the picture in each area of the current frame has been changed. The group of gradation levels displaying the picture signal can be selected based on the group of gradation level outputted by detecting the motion of the picture in each area from the previously detected frames up to the current frame, and therefore a group of gradation levels does not need to be frequently changed. Accordingly, it minimizes generation of flicker.

Figure 3:
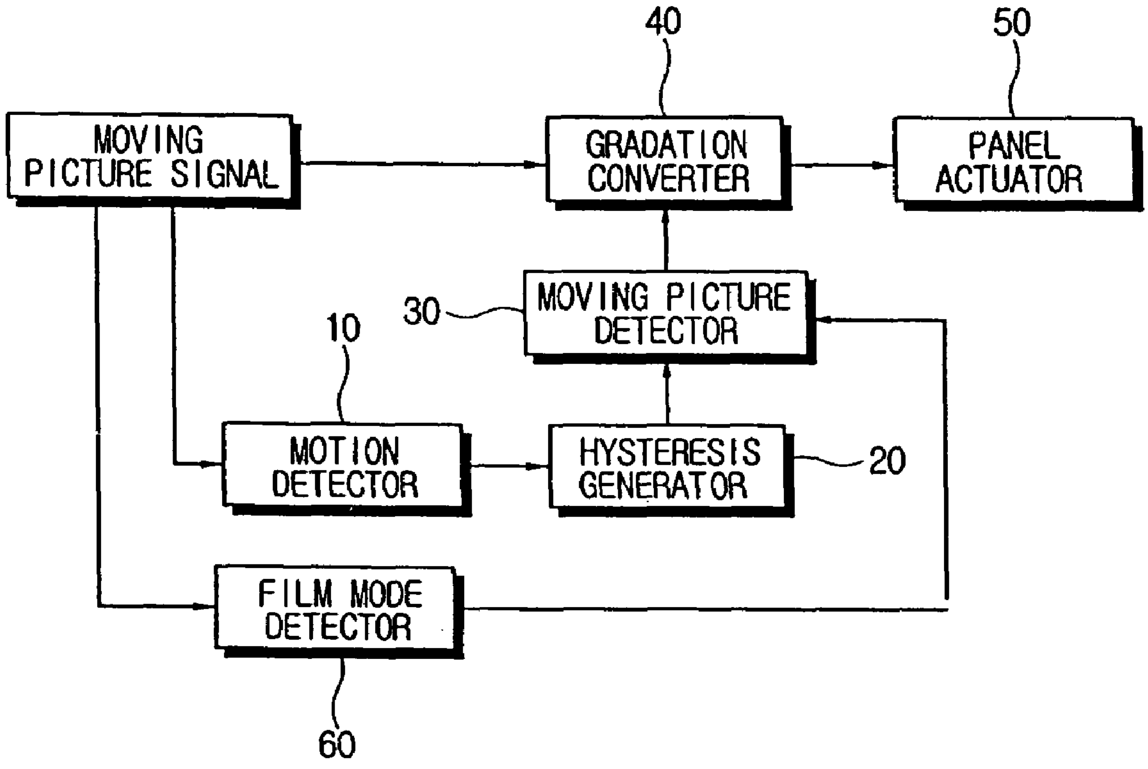
FIG. 3 is a control block diagram of a display apparatus according to another embodiment of the present general inventive concept.

FIG. 3 is a control block diagram of a display apparatus according to another embodiment of the present general inventive concept As shown in FIGS. 2 and 3, the display apparatus further includes a film mode detector 60 to detect whether each frame of a picture signal is a film mode that each frame is repeatedly inputted for a predetermined number of times.

According to the detected result of the film mode detector 60, an output method of the hysteresis information and a reference to detect a moving picture signal or a still picture signal can be changed. Accordingly, picture signals inputted through various picture display media including a DVD can also be appropriately converted.

The generating of the flicker can be prevented if a same group of gradation levels that has been applied to a former frame can also be applied to the current frame. For example, if a picture signal of an area of the former frame is converted to a group of gradation levels for the moving picture and the motion detector 10 detects a motion of a picture of the area in the current frame, there is no need to change the group of gradation levels for the current frame.

Accordingly, the reference used to change the group of gradation levels to be applied to the current frame can be decided when the group of gradation levels applied to the former frame need to change only if the detected result of the motion detector 10 on the current frame is considered.

Figure 4:
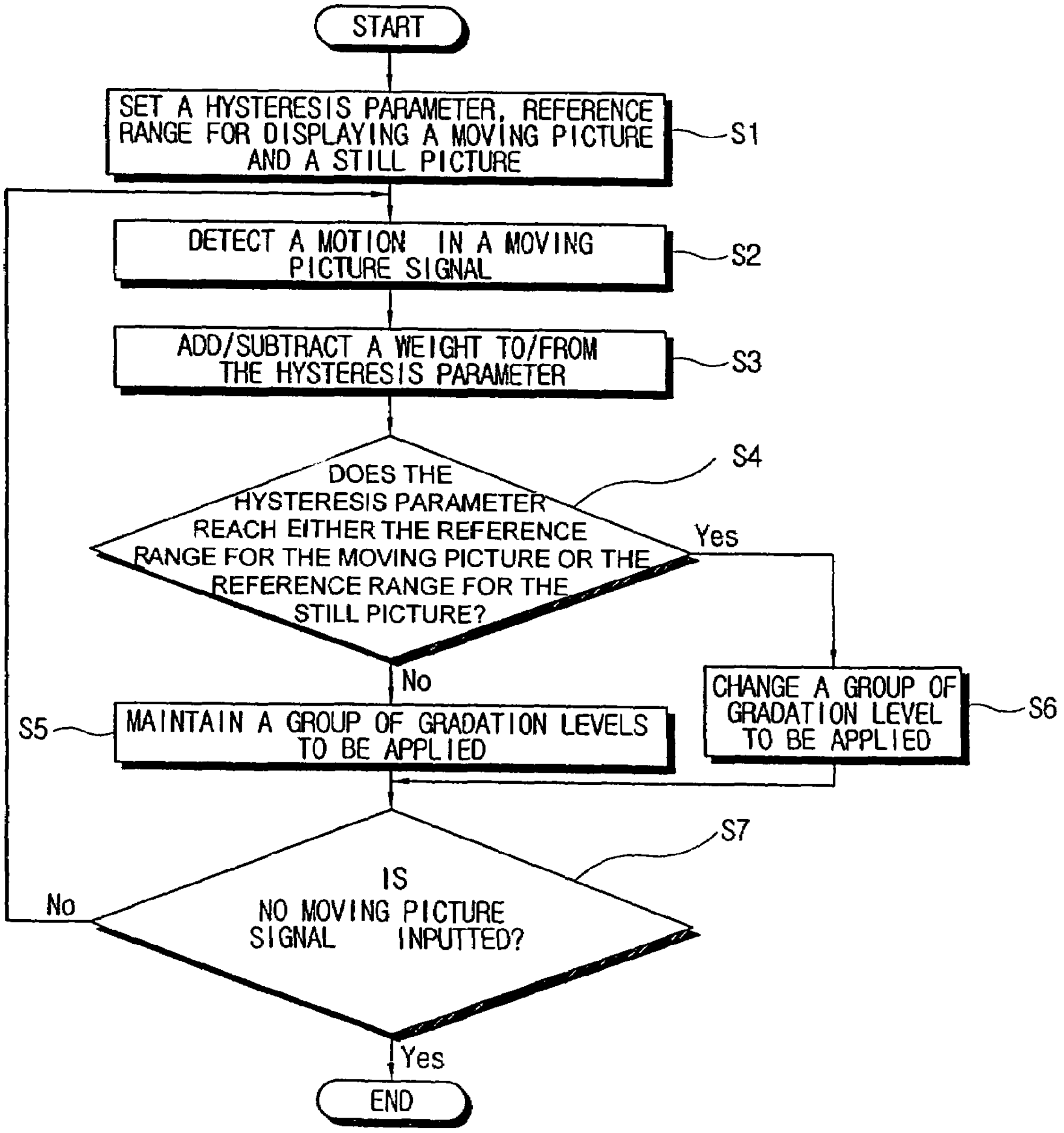
FIG. 4 is a flow chart illustrating a change of a group of gradation levels to be applied in a display apparatus according to another embodiment of the present general inventive concept.
Figure 5:
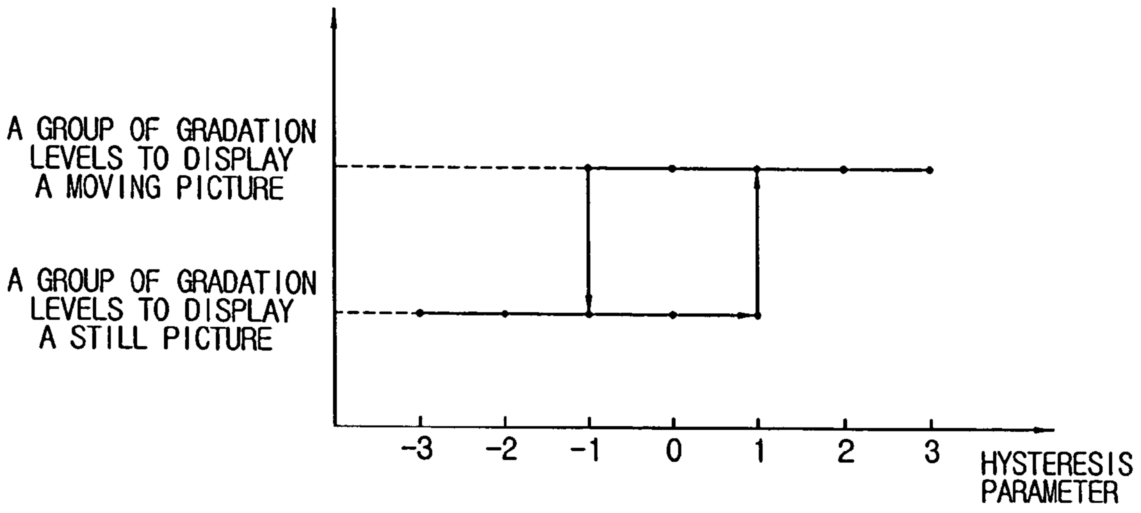
FIG. 5 is a view illustrating a hysteresis loop according to history information.

FIG. 4 is a flow chart illustrating a process of changing a group of gradation levels to be applied according to another embodiment of the present general inventive concept, and FIG. 5 is a view illustrating a detailed hysteresis loop based on hysteresis information in the display apparatus shown in FIGS. 2 and 3.

Referring to FIGS. 4 and 5, the embodiment of the present invention will be described in detail hereinafter.

In operation S1, a hysteresis parameter having a maximum value and a minimum value, a weight to be added to or subtracted from the hysteresis parameter according to the detecting result of the motion detector of FIG. 2, and a reference range to change a group of gradation levels for a moving picture or a still picture are set in the hysteresis generator 20.

For example, the maximum value and the minimum value of the hysteresis parameter are set to +3 and −3 respectively. The weight of +1 can be added to the hysteresis parameter if a motion is detected. Otherwise, the weight of +1 can be subtracted from the hysteresis parameter. The reference ranges are set to [1-3] for the moving picture, are set to [−3~−1] for the still picture, and are set to [−1~1] for both the moving and still pictures by maintaining a previously detected result, and thus a group of gradation levels for the moving-picture and a group of gradation levels for the still picture can be applied.

Then, the motion detector 10 can detect whether a picture in a certain area of the current frame is in motion or not in operation S2. The weight is continuously added to or subtracted from the hysteresis parameter depending the detected result of the motion detector 10 in operation S3, and a group of gradation levels to be applied can be selected depending on the added or subtracted hysteresis parameter among the above references ranges for the moving picture or the still picture in operations S4-S6.

For example, when an initial value of the hysteresis parameter in a first frame is +2 and no motion in the picture is detected therein, the value of the hysteresis parameter can become +1. Here, a group of gradation levels for the moving picture applied to the former frame may be changed if no motion is detected in a picture of the current frame. However, because the value of the hysteresis parameter does not reach −1 of the reference range for a still picture [−3~−1], the picture signal of the current frame can be converted into the same group of gradation levels for a moving picture applied to the former frame.

If no motion is detected in the picture of the same area in a second frame, the value of the hysteresis parameter can become 0, and the same group of gradation levels for the moving picture can be applied.

However, if no motion is detected in the picture of same area in a third frame, the value of the hysteresis parameter becomes −1, which reaches the reference range for the still picture, the group of gradation levels for the moving picture can be converted into a group of gradation levels for the still picture.

In a fourth frame, in a case that a motion is detected in the same area, a group of gradation levels applied to the former frame can be converted into a group of gradation levels for the moving picture in a conventional display apparatus, thereby generating flicker. However, according to an aspect of the present general inventive concept, because the value of the hysteresis parameter becomes 0 which does not reach a threshold value of 1 in the reference range of the moving picture, the group of gradation levels for the still picture still can be applied thereto, thereby avoiding flicker. Here, the motion detector 10 can detect the motion in a predetermined number of sample pixels of each area to reduce memory consumption. The hysteresis generator 20, then, outputs the hysteresis information of the gradation levels representing each area based on the detected result of the motion detector 10 for the sample pixels. Therefore, it is very efficient to set a representative hysteresis parameter for each area and to set a weight considering the detecting result on each sample pixel, thereby reducing computation and memory consumption.

Figure 6A:
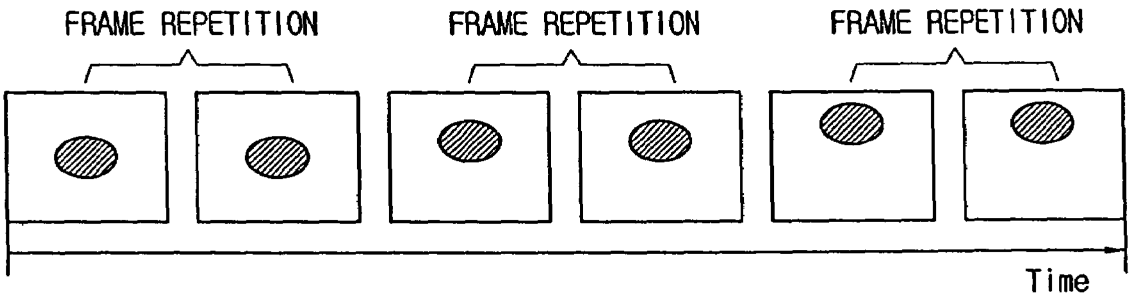
FIG. 6A is a view illustrating a picture signal in a film mode so that each frames of the picture signal is repeatedly inputted for a predetermined number of times.
Figure 6B:
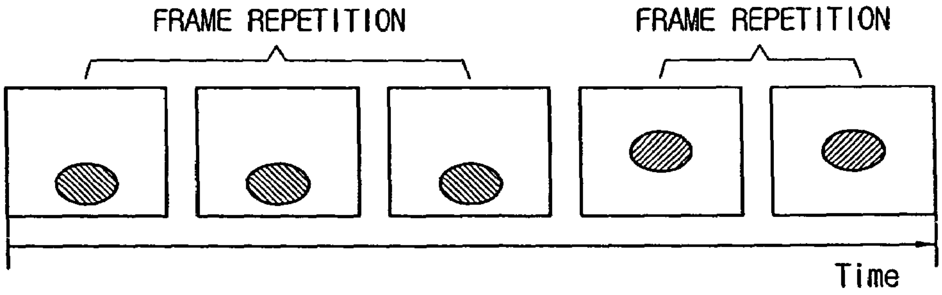
FIG. 6B is a view illustrating the repetition of the frames in the inputted picture signal having a certain regulation.

On the other hand, as shown in FIGS. 6A and 6B, each frame of the picture signal can be repeatedly inputted a certain number of times, or an inputted picture signal can be a film mode so that each frame is repeatedly inputted with a regular ratio (3:2) as shown in FIG. 6B. The ratio of repetition in the film mode varies according to regional standards, for example, in the film mode employed in South America and Europe, a frame is repeatedly inputted twice as shown in FIG. 6A, whereas it repeats with a ratio of 3:2 according to the NTSC standard in North America and Asia. Therefore, a reference for the hysteresis information should be accompanied with the film mode and its regional standard.

Referring to FIGS. 4 and 5, a threshold value of each reference range for the moving picture and the still picture can be changed corresponding to various film modes. Alternatively, detecting how many times a frame repeats, and sampling the frames by the repeated number to avoid repetition when the motion detector detects the motion in the film mode, may properly correspond to the film modes.

Although the above embodiments describe the frame of the picture signal, the present general inventive concept is not limited thereto. For example, a field can be used as the frame of the picture signal. As another example, any portion of the picture signal can be used as the frame.

There are various methods, which are different from the above-mentioned methods, of deciding whether to change a group of gradation levels to be applied. For example, a group of gradation levels may be changed if a detected result on a current frame is constantly repeated in a predetermined number of frames in inverse order, and the group of gradation levels can be changed based on the detected result on the current frame. However, in this case, the repeated number of frames should be more than two in a row. Another method is to preset a range of frames to calculate hysteresis and then to select a group of gradation levels to be applied based on a number of frames repeated during detecting a plurality of preset frames.

The moving picture detector 30 can determine whether the hysteresis information is suitably applied to a predetermined converting condition to determine whether or not a group of gradation levels needs to be converted, and the above-described algorithms are detailed examples of the hysteresis information and the converting condition.

Although a few-embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus to receive a picture signal containing information of a picture and to process the picture signal by at least an area making up the picture, comprising:

a motion detector to detect whether there is a motion in an area of a picture signal;

a hysteresis generator to output hysteresis information on each area according to a detected result of the motion detector from at least one of previous frames and a current frame;

a moving picture detector to detect whether the picture signal is a moving picture signal or a still picture signal in the area on the basis of the hysteresis information; and a gradation level converter to convert the picture signal corresponding to the area into either a group of gradation levels for a moving picture to display the moving picture signal or a group of gradation levels for a still picture to display the still picture signal according to a detected result of the moving picture detector.

2. The display apparatus according to claim 1, wherein the hysteresis generator outputs the hysteresis information by adding and subtracting a weight according to the detected result of the motion detector to and from a predetermined hysteresis parameter, and the moving picture detector detects whether the picture signal corresponding to the area is the moving picture signal or the still picture signal based on a value of the hysteresis parameter.

3. The display apparatus according to claim 2, wherein the moving picture detector detects the picture signal corresponding to the area as the moving picture signal when the value of the hysteresis parameter reaches a first reference range of the moving picture, detects the picture signal corresponding to the area as the still picture signal when the value of the hysteresis parameter reaches a second predetermined reference range of the still picture, and outputs to maintain the detecting result of the previous frame when the value of the hysteresis parameter is between the first reference range of the moving picture and the second reference range of the still picture.

4. The display apparatus according to claim 2, wherein the hysteresis parameter varies within a limited range.

5. The display apparatus according to claim 3, wherein the hysteresis parameter varies within a limited range.

6. The display apparatus according to claim 1, wherein the moving picture detector detects the picture signal corresponding to the area as the moving picture signal when a motion in the area is repeatedly detected in at least two consecutive frames by the motion detector.

7. The display apparatus according to claim 1, further comprising:

a film mode detector to detect whether each frame of the picture signal is inputted as a film mode in which the frame is repeatedly inputted for predetermined number of times, wherein the moving picture detector changes a detecting reference to determine the moving picture signal or the still picture signal, based on the hysteresis information and a detected result of the film mode detector.

8. The display apparatus according to claim 1, wherein the motion detector detects whether an image of the area is in motion by detecting a predetermined number of sample pixels in the area, and the hysteresis generator outputs the hysteresis information on the area containing the sample pixels from the previous frame up to the current frame based on the detected results of the motion detector from the sample pixels of each area.

9. The display apparatus according to claim 2, wherein the motion detector detects whether an image of the area is in motion by detecting a predetermined number of sample pixels in the area, and the hysteresis generator outputs the hysteresis information on the area containing the sample pixels from the previous frame up to the current frame based on the detected results of the motion detector from the sample pixels of each area.

* * * * *